United States Patent
Agarwal et al.

(10) Patent No.: US 12,265,783 B2
(45) Date of Patent: Apr. 1, 2025

(54) SYSTEMS AND METHODS FOR MULTI-MODAL CONVERSATION SUMMARIZATION ON A CONVERSATION PLATFORM

(71) Applicant: Salesforce, Inc., San Francisco, CA (US)

(72) Inventors: Divyansh Agarwal, San Francisco, CA (US); Chien-Sheng Wu, Mountain View, CA (US); Tian Xie, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/054,511

(22) Filed: Nov. 10, 2022

(65) Prior Publication Data

US 2024/0160837 A1    May 16, 2024

(51) Int. Cl.

| | |
|---|---|
| *G06F 16/00* | (2019.01) |
| *G06F 16/334* | (2025.01) |
| *G06F 16/34* | (2019.01) |
| *G06F 40/166* | (2020.01) |
| *G06F 40/205* | (2020.01) |
| *H04L 51/216* | (2022.01) |
| *G06V 20/40* | (2022.01) |

(52) U.S. Cl.
CPC ........ *G06F 40/166* (2020.01); *G06F 16/3344* (2019.01); *G06F 16/345* (2019.01); *G06F 40/205* (2020.01); *H04L 51/216* (2022.05); *G06V 20/47* (2022.01)

(58) Field of Classification Search
None
See application file for complete search history.

(56) References Cited

U.S. PATENT DOCUMENTS 7,299,261 B1 * 11/2007 Oliver ................. G06Q 10/107
709/204
11,244,755 B1 * 2/2022 Syeda-Mahmood .... G06N 3/04
(Continued)

OTHER PUBLICATIONS

Cox et al., "Scanning the Technology: On the Applications of Multimedia Processing to Communications" Proceedings of the IEEE, copyright 1998 IEEE, 70 pages. (Year: 1998).*

(Continued)

*Primary Examiner* — Amelia L Tapp
(74) *Attorney, Agent, or Firm* — Haynes and Boone, LLP

(57) ABSTRACT

Embodiments described herein provide a multi-modal search-and-summarize tool for message platforms. Specifically, the multi-modal search-and-summarize tool may monitor conversational content of different formats, e.g., text, image, video, etc., and use multi-modal summarization models to generate a summary of the conversation channel. The summarization may be conducted via a search-and-summarize process in response to a specific user query, e.g., a user may enter "what did John and Josh say about the presentation tomorrow?" The multi-modal summarization model would first search for relevant conversation messages between user John and user Josh, identify communication files of different format (e.g., text messages, emojis, multimedia attachments, etc.), and then input the communication files to respective text or image encoders to generate a summary of the communication content.

15 Claims, 10 Drawing Sheets

(56) References Cited

U.S. PATENT DOCUMENTS

| | | | | |
|---|---|---|---|---|
| 11,809,480 | B1* | 11/2023 | Cheng | G06F 16/434 |
| 2003/0004966 | A1* | 1/2003 | Bolle | G06F 16/5846 |
| | | | | 707/E17.103 |
| 2007/0244975 | A1* | 10/2007 | Dillon | G06Q 10/107 |
| | | | | 709/206 |
| 2011/0320543 | A1* | 12/2011 | Bendel | G06F 16/9535 |
| | | | | 709/206 |
| 2013/0166280 | A1* | 6/2013 | Quast | H04L 51/04 |
| | | | | 704/9 |
| 2014/0079197 | A1* | 3/2014 | Hirschberg | G06F 16/345 |
| | | | | 379/88.14 |
| 2016/0147387 | A1* | 5/2016 | Rahman | G06F 40/258 |
| | | | | 715/752 |
| 2018/0367483 | A1* | 12/2018 | Rodriguez | H04L 51/046 |
| 2021/0263959 | A1* | 8/2021 | Bastide | H04L 51/216 |
| 2021/0374552 | A1* | 12/2021 | Mallya | G06N 3/088 |

OTHER PUBLICATIONS

O'Day et al., "Text Message Corpus: Applying Natural Language Processing To Mobile Device Forensics" 2013 IEEE International Conference on Multimedia and Expo Workshops, 6 pages. (Year: 2013).*

Feng et al., "Automatic Caption Generation for News Images," in IEEE Transactions on Pattern Analysis and Machine Intelligence, vol. 35, No. 4, pp. 797-812, Apr. 2013. (Year: 2013).*

Ritter et al., "Toward Application Integration with Multimedia Data," 2017 IEEE 21st International Enterprise Distributed Object Computing Conference (EDOC), Quebec City, QC, Canada, 2017, pp. 103-112. (Year: 2017).*

* cited by examiner

SYSTEMS AND METHODS FOR MULTI-MODAL CONVERSATION SUMMARIZATION ON A CONVERSATION PLATFORM

CROSS REFERENCES

The instant application is related to co-pending U.S. nonprovisional application Ser. No. 17/589,487, filed Sep. 2, 2022, which is hereby expressly incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The embodiments relate generally to natural language processing and machine learning systems, and more specifically to systems and methods for multi-modal summarization in an online conversation platform of a multi-tenant system

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Online chat platform and/or message board applications have been widely used for users to share their thoughts on various topics. At times, users may be interested in reviewing and tracking the conversation content. However, conversation data can be largely scattered and voluminous for manual review. Existing systems may allow a user to search through textual conversation data based on key terms to access certain relevant conversation lines. Or some applications may provide a hashtag "#" function so that a user may review a series of conversation data of a certain topic under the hashtag. In these existing chat systems, however, even if a user is able to access or search through for conversation texts under a desired topic that has been designated under the hashtag, information presented to the user is still rather scattered and disorganized. The user still needs to spend significant time and efforts to manually review a large amount of conversation messages.

Therefore, there is a need for a more efficient mechanism for a user to obtain information from raw conversation messages.

Figure 1:
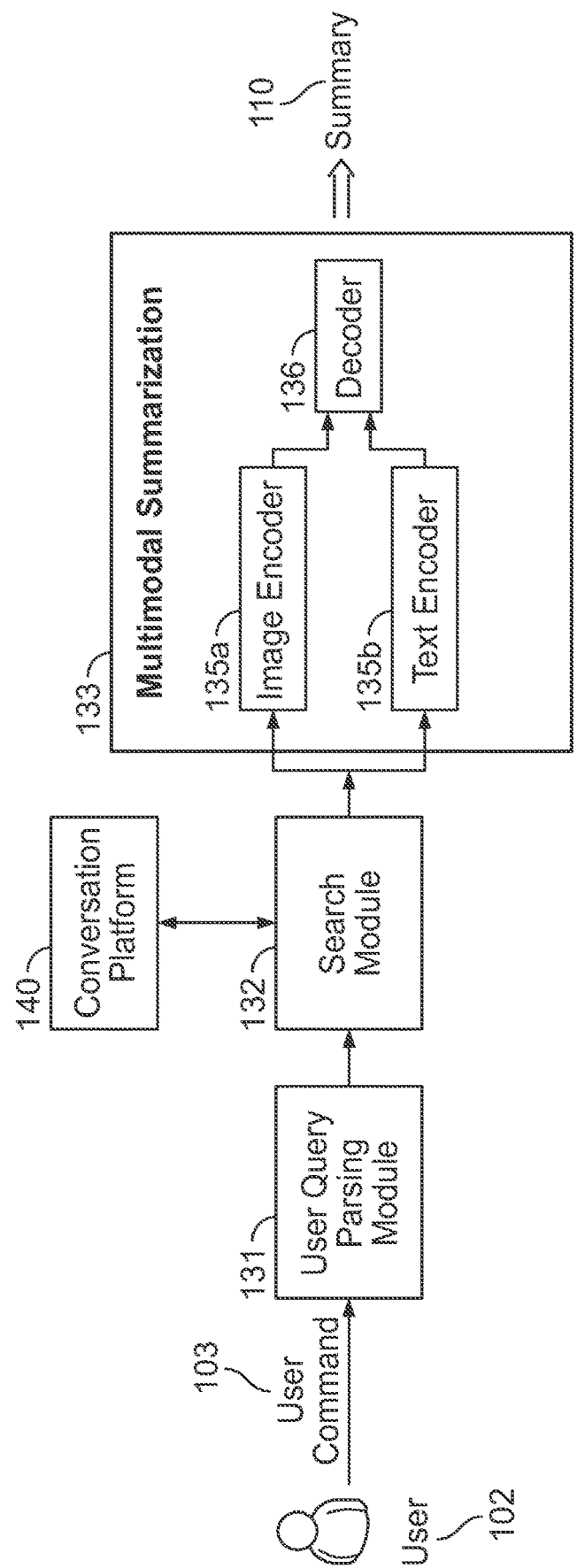
FIG. 1 is a simplified diagram illustrating a multi-modal search and summarize framework, according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "conversation" may be used to refer to any audio, textual communication in any other media form. For example, the conversation may include a shared post on an online platform, a real-time dialogue, and/or the like.

As used herein, the term "channel" may be used to refer to a communication group on a communication platform for conducting conversations relating to certain topics associated with the communication group.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Multi-tenant messaging platforms have been used to provide communication between multiple parties to exchange information and communicate on project development. Existing multi-tenant message systems, however, largely rely on each individual user to keep track of conversational content from the messaging platform.

In view of the need for an efficient mechanism for a user to obtain information from raw conversation messages, embodiments described herein provide a multi-modal search-and-summarize tool for message platforms. Specifically, the multi-modal search-and-summarize tool may monitor conversational content of different formats, e.g., text, image, video, etc., and use multi-modal summarization models to generate a summary of the conversation channel. The summarization may be conducted via a search-and-summarize process in response to a specific user query, e.g., a user may enter "what did John and Josh say about the presentation tomorrow?" The multi-modal summarization model would first search for relevant conversation messages between user John and user Josh, identify communication files of different format (e.g., text messages, emojis, multimedia attachments, etc.), and then input the communication files to respective text or image encoders to generate a summary of the communication content. For example, the summary may take a form of a text summary that references the multimedia attachments.

In one implementation, the multi-modal search-and-summarize framework provides abstractive summarization that allows users to summarize their communication channels, curate a well-formed and readable summary of the conversations they might have missed or find too long to read through, or link each summary sentence to original conversation(s). In order to build trust with the users (the need for which was also captured in our initial feedback), users can verify the summaries they see by navigating to the original message(s) in the channel.

In one implementation, users may configure recurring summary deliveries, e.g., to create recurring abstractive summaries of conversations delivered daily (on weekdays) or weekly (last 7 days).

In one implementation, users may choose to summarize single conversations, e.g., summarizing/paraphrasing a single message that is too long to read or has multiple replies, or join multiple conversations or even multiple conversation channels.

In one implementation, the multi-modal search-and-summarize framework may perform query based smart conversation search, e.g., allowing users to search answers for their queries using a mix of dense+sparse retrieval.

Overview

FIG. 1 is a simplified diagram illustrating a multi-modal search and summarize framework 100 according to some embodiments. The framework 100 comprises a user query parsing module 131, a search module 132 and a multi-modal summarization module 133, one or more of which interact with, or implemented in conjunction with a conversation platform 140. In one implementation, the framework 100 may be installed at a centralized server. In another implementation, one or more modules of the framework 100 may be located at different distributed servers. For example, the conversation platform 140 may be located at a remote server, while the user query parsing module 131 and the search module 132 may be located on a user device, and the multi-summarization module 133 may be located at a different distributed server.

In one implementation, the conversation platform 140 may be a messaging program that supports multi-party communication, e.g., SLACK®, etc.

In one embodiment, a user 102 may operate a user device (e.g., as further discussed in relation to 310 in FIG. 3) to send a user command 103 via a user interface to a user query parting module 131. For example, the user command 103 may comprise a natural language command, e.g., in the form of a question "what did John and Josh say about the presentation tomorrow?" The user query parsing module 131 may then extract entities in the natural language question, such as "John," "Josh," "presentation," and "tomorrow." For another example, the user command 103 may comprise a user configuration of parameters for summarization, e.g., past 7 days, past 2 weeks, and/or a specific start date to a specific end date.

The extracted entities may be passed to the search module 132, which may conduct a multi-modal search on the conversation platform 140 to retrieve a set of conversation messages relating to the extracted entities. In one embodiment, the search module 132 may conduct a key word matching search on the conversation messages to retrieve messages that originate from user "John" and "Josh" while containing the key word "presentation."

In another embodiment, the search module 132 may contain a neural network based prediction model that may generate one or more predicted keywords for the search based on the one or more identified entities and/or the natural language question. For example, the search module 132 may generate additional search terms such as "slides," "revision," "version," "meeting," "seminar," "webinar," and/or the like.

In another embodiment, the search module 132 may contain a filter model that may predict whether a message between user "John" and "Josh" is relevant to the natural language question. The filter model may be trained by a training dataset of previous conversation messages, each being annotated with one or more relevant topics.

In one embodiment, the search module 132 may include all multimedia file attachments in the conversation messages on the conversation platform 140, and send the searched messages as relevant to the user command 103 to the multimodal summarization module 133.

The multimodal summarization model 133 may comprise an image encoder 135a, a text encoder 135b, and a decoder 136. The multimodal summarization model 133 may input text content from text messages to the text encoder 135b, which encodes the text input into a text representation. For example, the text input to the text encoder 135b may comprise any text messages, and/or audio content in the multimedia file attachment that has been converted to text. The multimodal summarization module 133 may also input image content from multimedia file attachments, e.g., image attachment, emojis, video frames that have been sampled from video file attachment, and/or the like, to the image encoder 135a, which may in turn extract visual features and generate an image representation. The text representation and the image representation are then passed to the decoder 136, which may output a summary 110 that summarize the conversation messages including their multimedia file attachments that are relevant to the user command 103.

In one implementation, to alleviate computational overhead, the image encoder 135*a* may be optional. Instead of encoding image features from multimedia file attachments from conversation messages, the file name (e.g., "demo_team_management_flow.mov," etc.) and/or metadata (e.g., sender, recipient, attachment date, version, etc.) may be included in the textual input. The multimodal summarization 133 may in turn generate a summary 110 that references the attachment, e.g., "team management flow is shown in a video attachment posted by John on 13:59 PM 01-24."

In this way, when a user 102 is interested in knowing communications on the conversation platform 140, the multimodal summarization model 133 may generate a summary 110 to the user in response to a user command 103 that specifies a user interest. The user 102 no longer needs to review a large volume of communication messages to look for information he or she is looking for. User experience of the conversation platform 140 thus is largely improved.

In one implementation, the interactions between the user 102 and the various modules 131, 132 and 133 may be conducted via a user interface. Example UI diagrams of the interactions may be discussed in relation to FIGS. 5A-5F.

In further implementations, the generated summary 110 may be presented to the user 102 in a visualized way via the user interface. For example, visualization of conversation summaries may be found in co-pending U.S. nonprovisional application Ser. No. 17/589,487, filed Sep. 2, 2022, which is hereby expressly incorporated by reference herein in its entirety.

Computer and Network Environment

Figure 2:
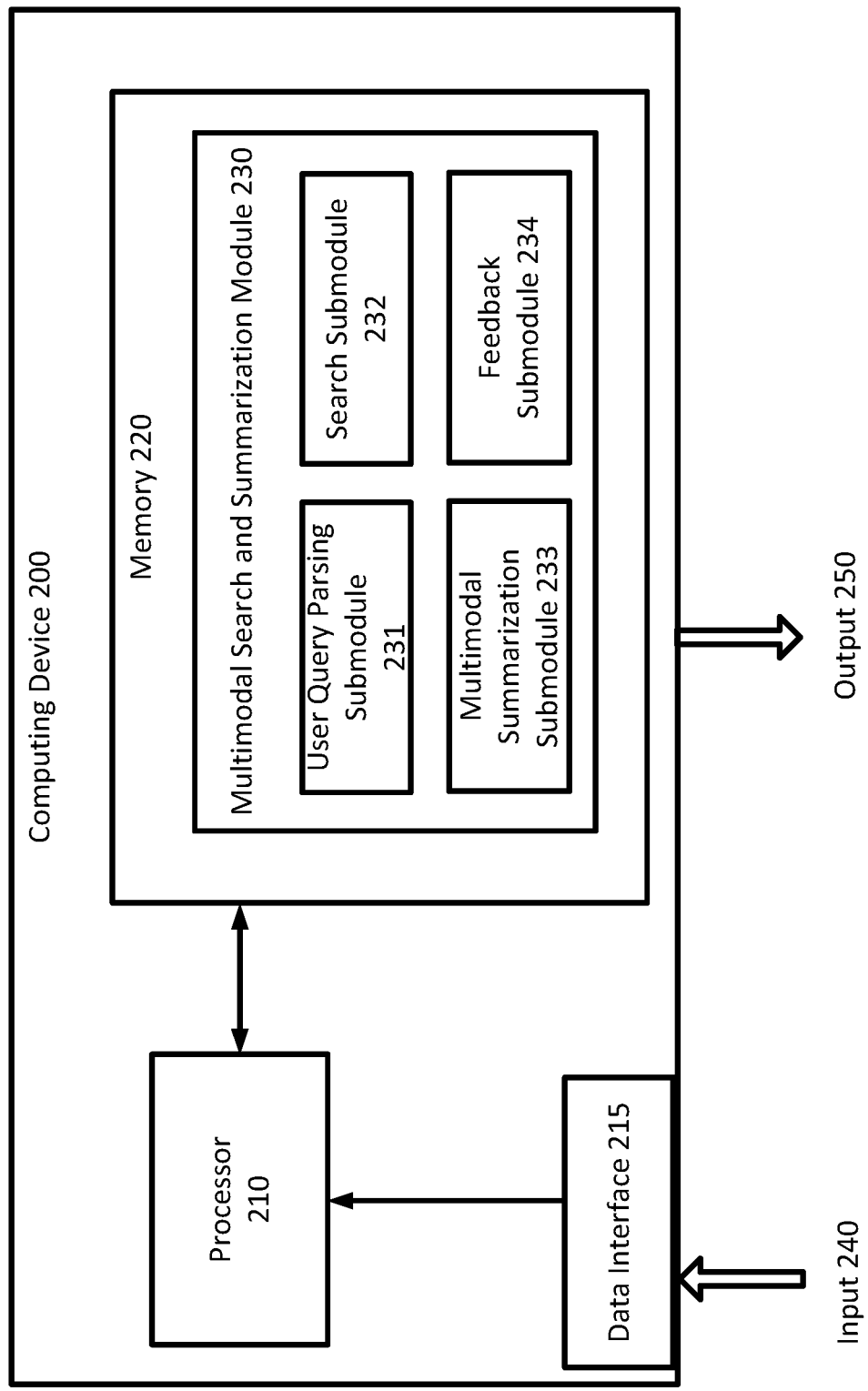
FIG. 2 is a simplified diagram illustrating a computing device implementing the multimodal search and summary framework described in FIG. 1, according to one embodiment described herein.

FIG. 2 is a simplified diagram illustrating a computing device implementing the multimodal search and summary framework described in FIG. 1, according to one embodiment described herein. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for multimodal search and summarization module 230 that may be used to implement and/or emulate the systems and models, and/or to implement any of the methods described further herein. A multimodal search and summarization module 230 may receive input 240 such as a user command 102 containing a natural language question and generate an output 250 which may be a summary 110 in FIG. 1. Examples of the input data may include a user question, a user search term, user configuration of summary parameters, user feedback of the summary, and/or the like. Another type of the input 240 may be communication messages from the conversation platform (e.g., 140 in FIG. 1).

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240, such as a user command, from a user via the user interface.

In some embodiments, the multimodal search and summarization module 230 is configured to generate a summary of conversation messages in response to a user natural language question. The multimodal search and summarization module 230 may further include an user query parsing submodule 231 (e.g., similar to 131 in FIG. 1), a search submodule 232 (e.g., similar to 132 in FIG. 1), a multimodal summarization submodule 233 (e.g., similar to 133 in FIG. 1) and a feedback submodule 234. The feedback submodule 234 may allow a user to enter a feedback comment in response to the generated summary in the output 250, and then adjust the summary accordingly. In one embodiment, the multimodal search and summarization module 230 and its submodules 231-234 may be implemented by hardware, software and/or a combination thereof.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
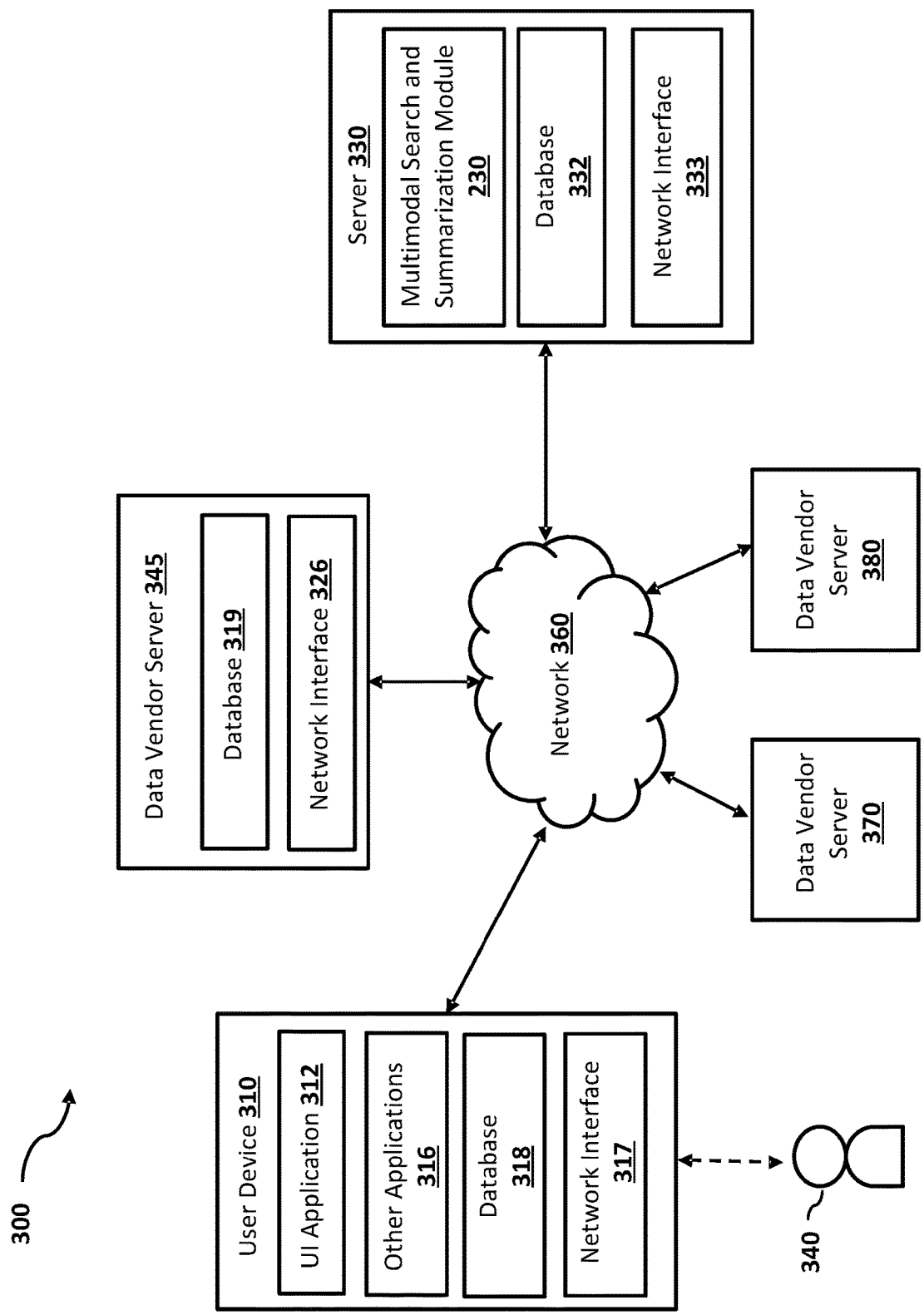
FIG. 3 is a simplified block diagram of a networked system suitable for implementing the multimodal search and summarization framework described in FIGS. and other embodiments described herein.

FIG. 3 is a simplified block diagram of a networked system suitable for implementing the multimodal search and summarization framework described in FIGS. and other embodiments described herein. In one embodiment, block diagram 300 shows a system including the user device 310 which may be operated by user 340, data vendor servers 345, 370 and 380, server 330, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message indicating a summary of conversation messages from the server 330 and display the message via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view the generated summary (e.g., 110 in FIG. 1).

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts database 319 to provide training datasets including a plurality of conversation messages to the server 330. The database 319 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the multimodal search and summarization module 230 and its submodules described in FIG. 1. In some implementations, multimodal search and summarization module 230 may receive data such as a record of conversation messages from database 319 at the data vendor server 345 via the network 360 to generate a summary. The generated summary may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the multimodal search and summarization module 230. In one implementation, the database 332 may store previously generated summaries, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Example Work Flows

Figure 4:
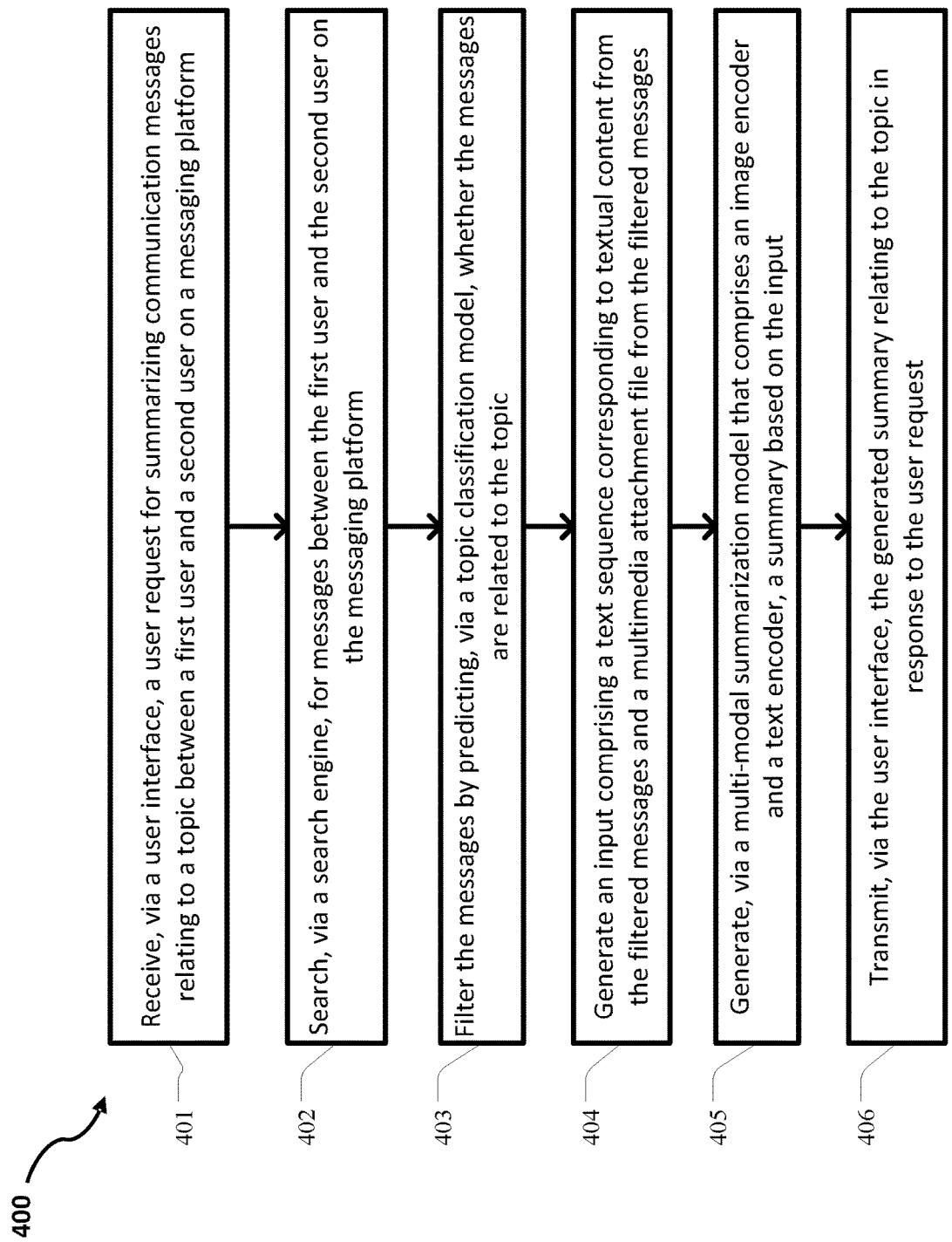
FIG. 4 is an example logic flow diagram illustrating a method of multi-modal summarization of communication on a messaging platform based on the framework shown in FIGS. 1-3, according to some embodiments described herein.

FIG. 4 is an example logic flow diagram illustrating a method of multi-modal summarization of communication on a messaging platform based on the framework shown in FIGS. 1-3, according to some embodiments described herein. One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of the multimodal search and summarization module 230 (e.g., FIGS. 2-3).

As illustrated, the method 400 includes a number of enumerated steps, but aspects of the method 400 may include additional steps before, after, and in between the enumerated steps. In some aspects, one or more of the enumerated steps may be omitted or performed in a different order.

At step 401, a user request (e.g., 103 in FIG. 1) is received, via a user interface, for summarizing communication messages relating to a topic between a first user and a second user on a messaging platform. For example, the user request takes a form of a natural language question, which may be parsed to identify entity names relating to the first user, the second user and the topic. For another example, the user request further comprises one or more parameters entered via the user interface, including a time range (e.g., last 7 days, last 14 days, etc.), one or more conversation channels on the messaging platform (e.g., selected channel names starting with hashtags), and a file format (e.g., multimedia attachment file in certain formats such as .xls, .jpg, .mov, .MP4, etc., may be selected)

At step 402, a search engine (e.g., search module 132 in FIG. 1) may search for messages between the first user and the second user on the messaging platform.

At step 403, the messages may be filtered by predicting, via a topic classification model, whether the messages are related to the topic. For example, the topic classification model is trained on a dataset of messages annotated with respective topic labels. In this way, predicted topics generated from the topic classification model may be compared with the topic labels to generate a loss, which can be used to update At step 404, an input including a text sequence corresponding to textual content from the filtered messages and a multimedia attachment file from the filtered messages may be generated.

At step 405, a multi-modal summarization model (e.g., 133 in FIG. 1) that includes an image encoder (e.g., 135a in FIG. 1) and a text encoder (e.g., 135b in FIG. 1) may generate a summary (e.g., 110 in FIG. 1) based on the input. The multimedia attachment file includes any of a spreadsheet file, a presentation slide file, an audio file, a video file and an image file. For example, for audio files, the audio file may be converted into a text document via speech recognition. For another example, for video files, one or more video frames may be generated from the video file. For example, the image encoder may encode an input image extracted from the multimedia file into a visual feature representation. The text encoder may encode the text sequence into a text feature representation. A decoder in the multi-modal summarization model may then generate the summary based on the visual feature representation and the text feature representation.

In an alternative implementation, the summary references the multimedia file in a text format.

At step 406, the generated summary (e.g., 110 in FIG. 1) relating to the topic may be transmitted, via the user interface, in response to the user request (e.g., 103 in FIG. 1). In one implementation, user feedback relating to the summary may be received from the user interface, e.g., "mis-spelled user name," etc. An updated summary may be generated according to the user feedback. The updated summary may be incorporated into a training dataset for training the multi-modal summarization model.

FIGS. 5A-5F provide example user interface (UI) diagrams 500 illustrating interactions between a user and the multi-modal search and summarization framework described herein, according to some embodiments described herein.

Figure 5A:
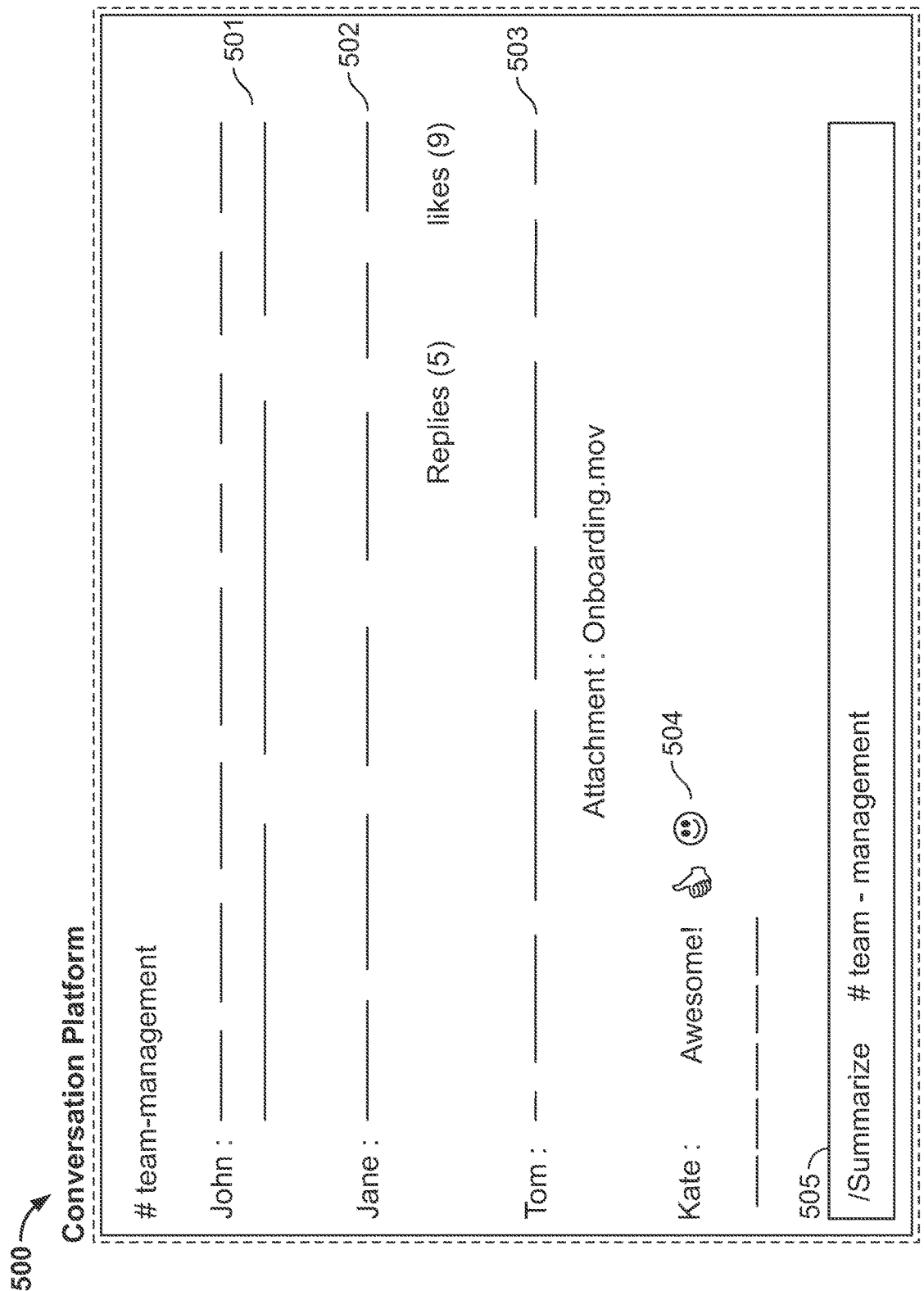
FIGS. 5A-5F provide example user interface (UI) diagrams 500 illustrating interactions between a user and the multi-modal search and summarization framework described herein, according to some embodiments described herein.

As shown in diagram 500 in FIG. 5A, the conversation platform (e.g., 140 in FIG. 1) may provide an interface illustrating conversation messages 501-504 between users in a conversation channel. For example, a conversation message 501 may be a text message; conversation message 502 may have an original post, but with folded replies; and conversation message 503 may have a multimedia attachment file; and conversation message 504 may be attached with several emojis. A user may enter a command "/summarize" to initiate a summarization command in the current conversation channel at the input box 505.

Figure 5B:
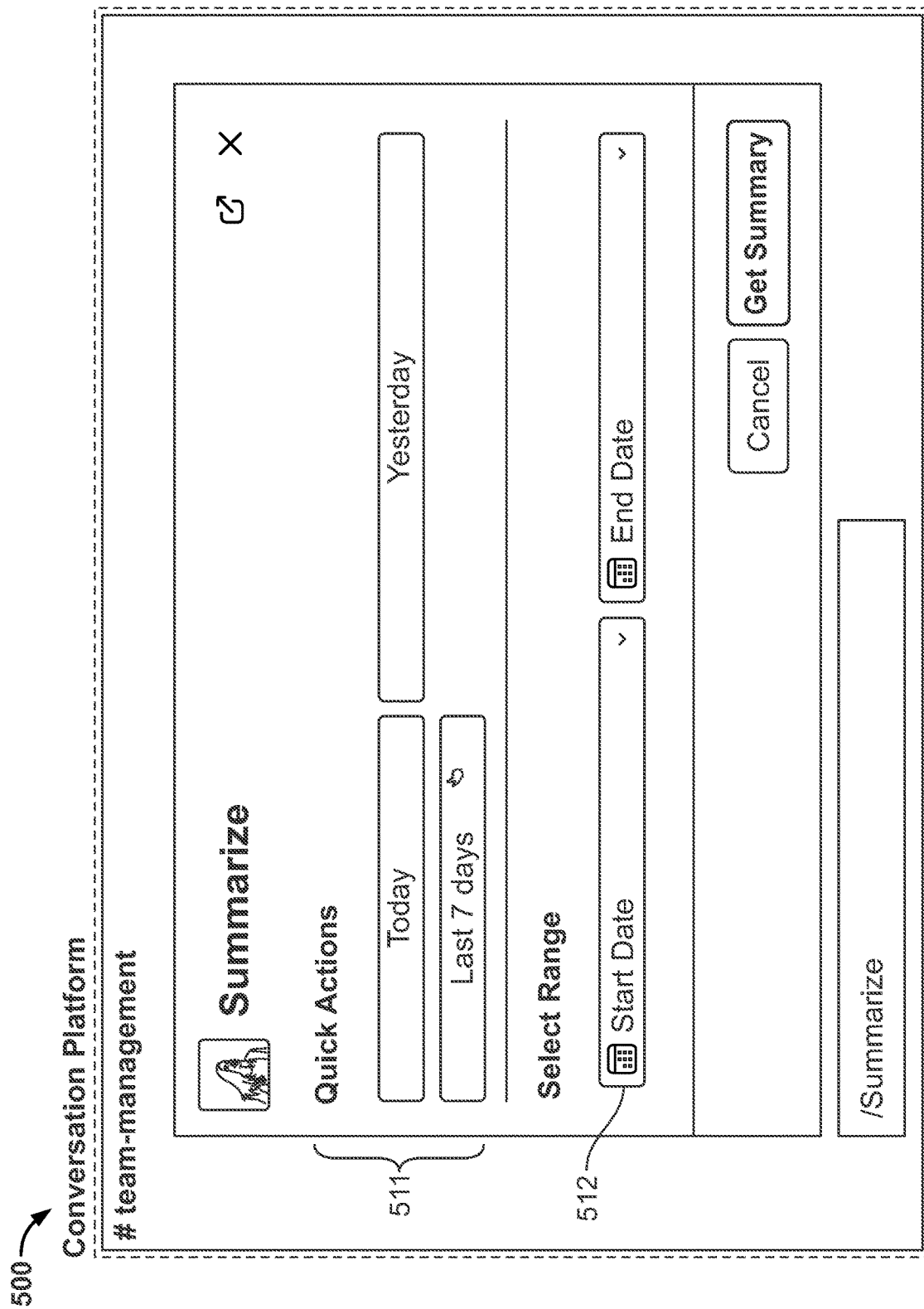

In FIG. 5B, the user may be presented with a pop-up window for a user to configure message summarization configuration. For example, a time range 511 such as "today," "yesterday," or "last 7 days" may be selected. Or the user may specify a start date and an end date 512 of communication for summarization.

Figure 5C:
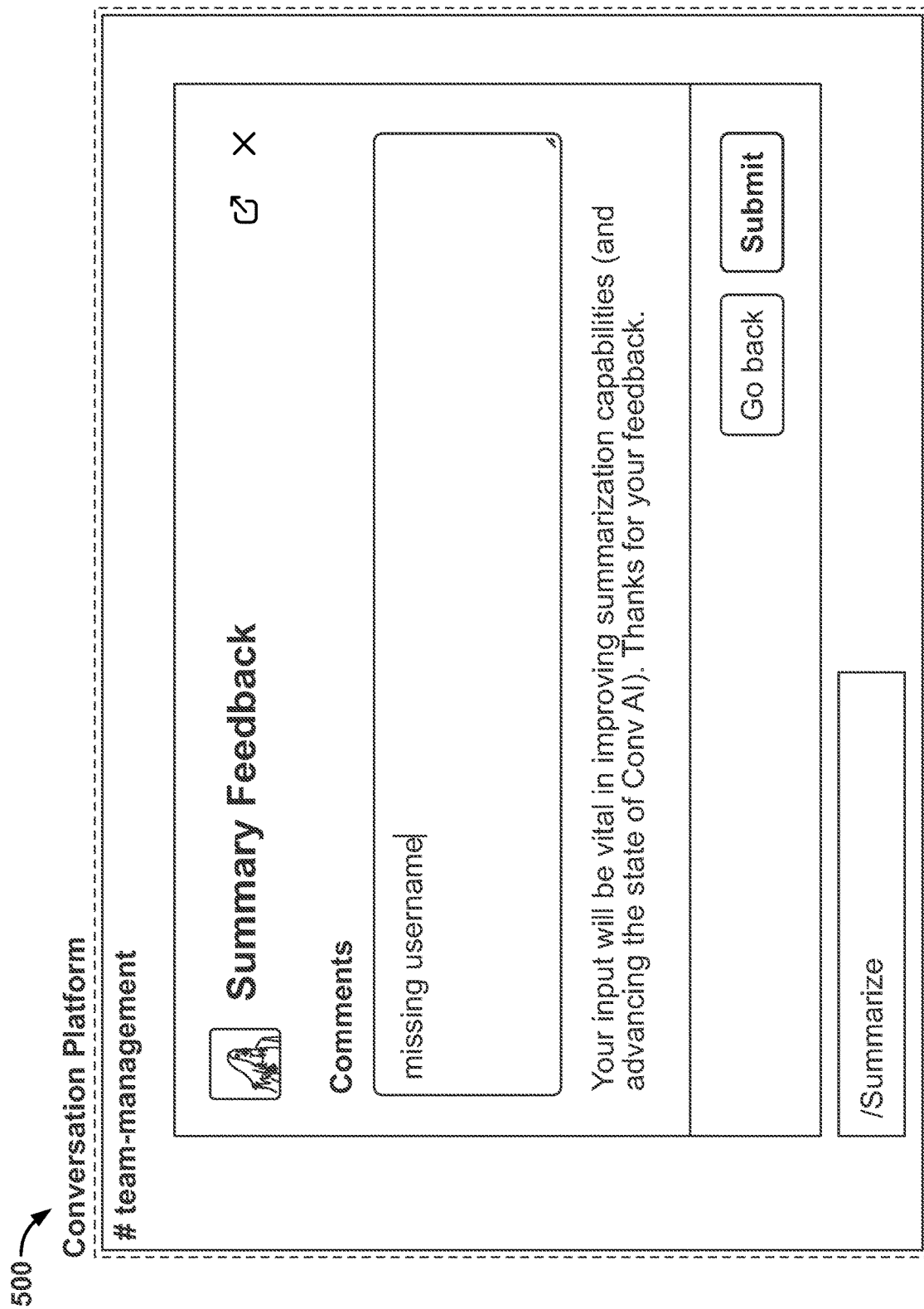

In FIG. 5C, a user may submit feedback of a generated summary through a comments section, e.g., by entering a natural language comment "missing username," etc.

Figure 5D:
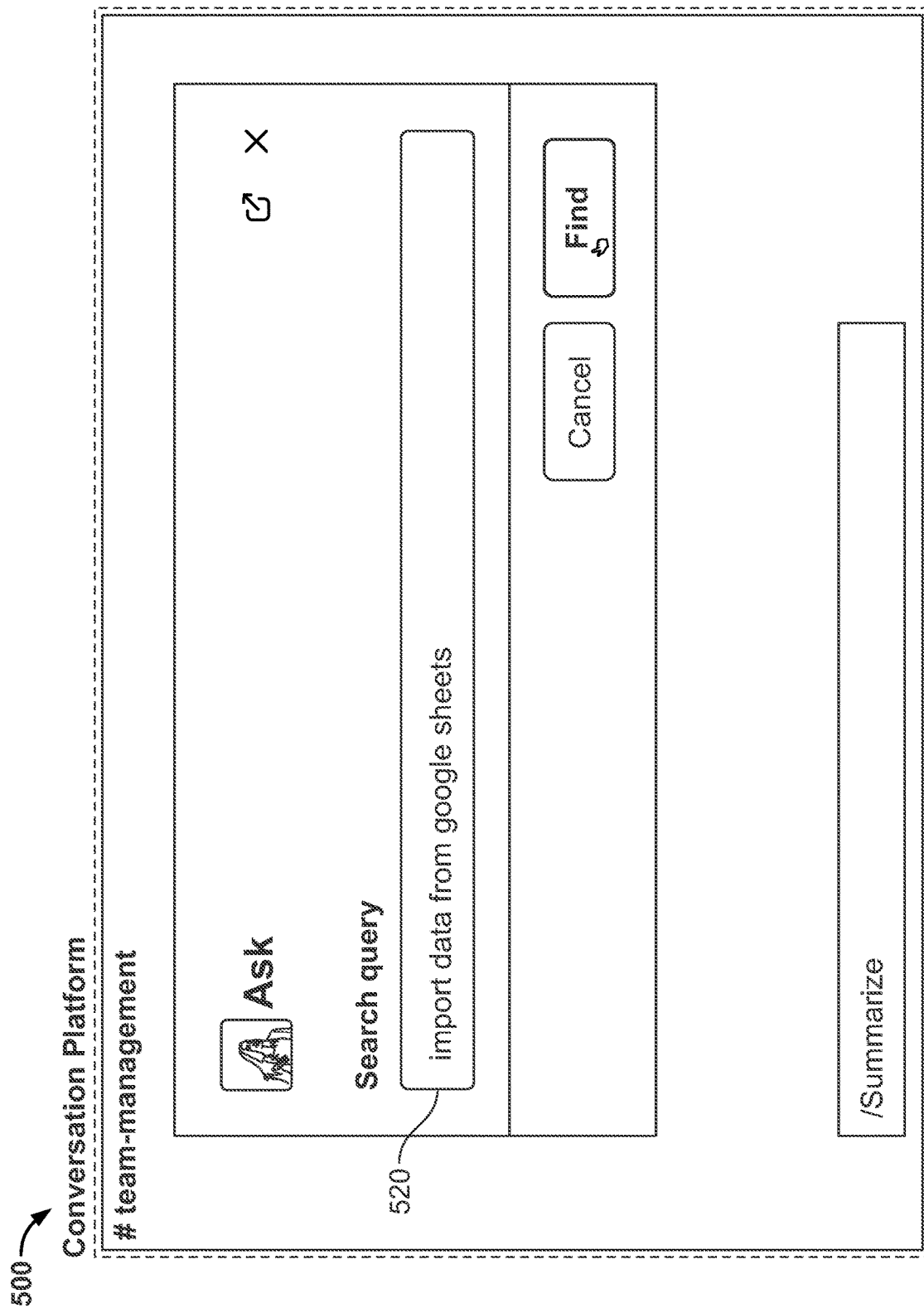

In FIG. 5D, a user may enter a query 520 to initiate a search, e.g., "import data from google sheets." The input query 520 may prompt the search module (e.g., 132 in FIG. 1) to search the conversation messages for related communication.

Figure 5E:
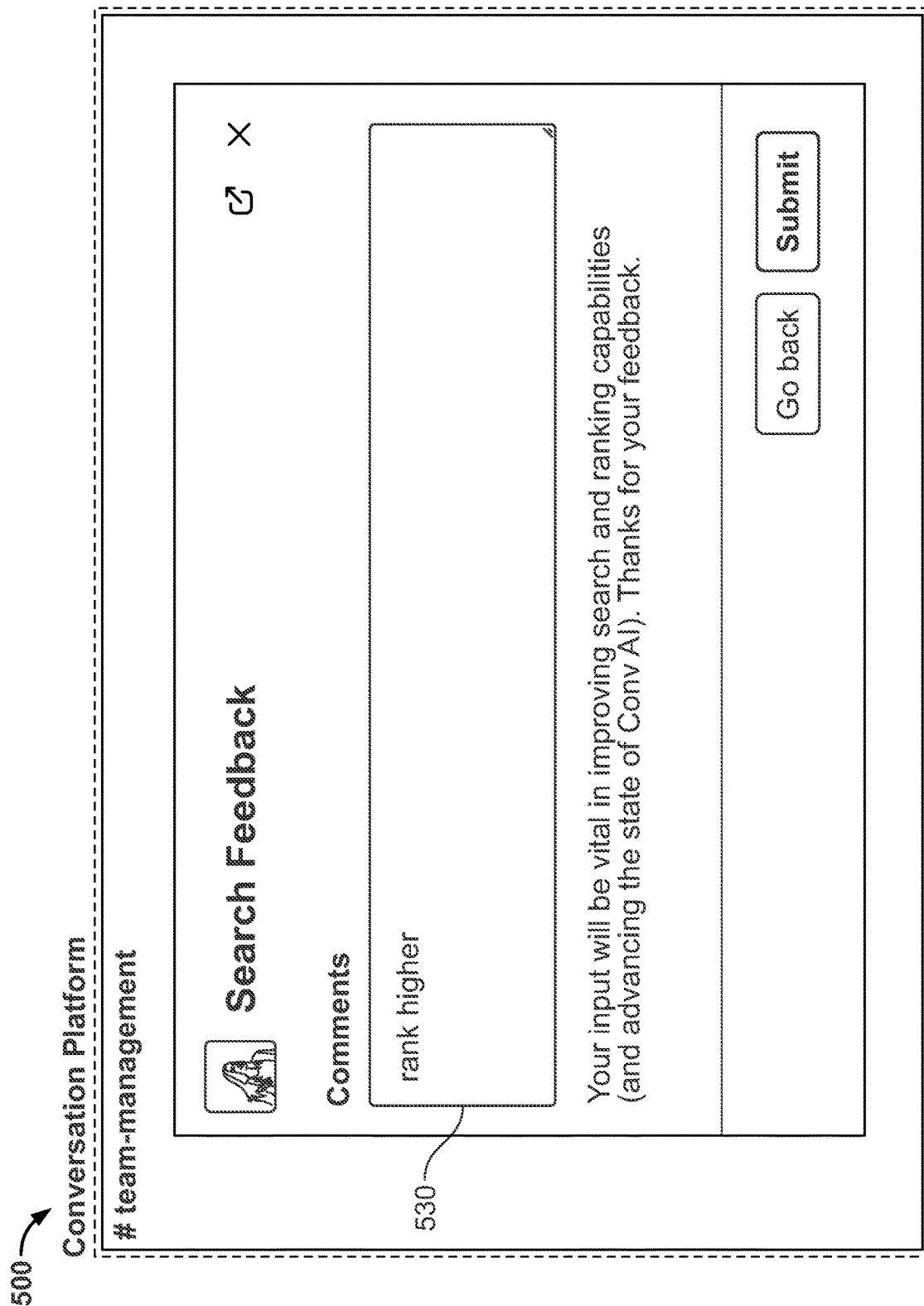

In FIG. 5E, a user may also enter a search result comment 530, e.g., to enter a preference "rank higher" to prompt the system to rank a particular search result as higher priority.

The preferred search result may be added to a training dataset to further tune the search module (e.g., 132 in FIG. 1).

Figure 5F:
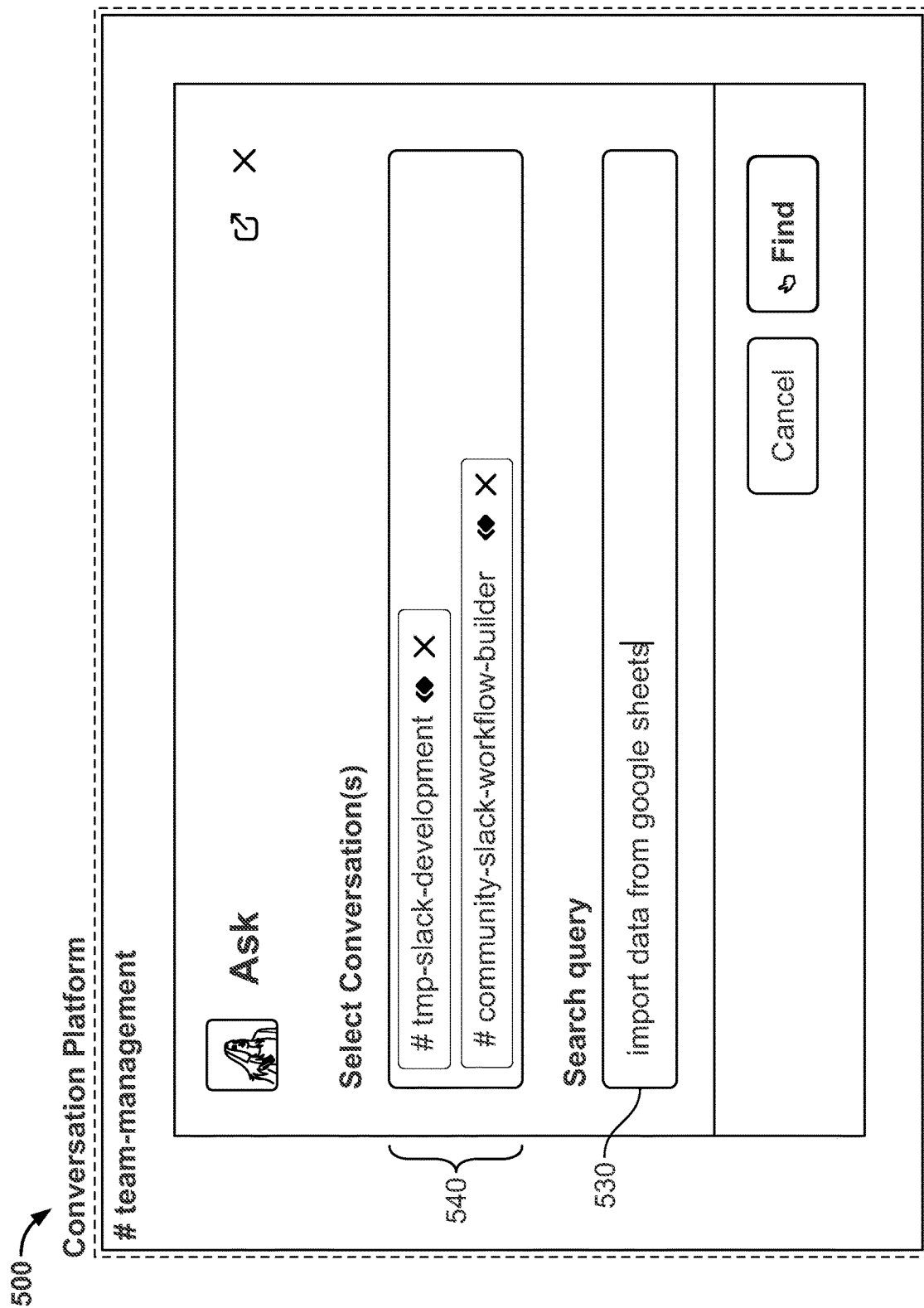

In FIG. 5F, a user may indicate multiple conversation channels, e.g., at 540, and a search query 530 to search through (and then summarize) across different channels.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of multi-modal summarization of communication on a messaging platform, the method comprising:
   receiving, via a user interface, a user request for summarizing communication messages relating to a topic between a first user and a second user on a messaging platform;
   searching, via a search engine, for messages between the first user and the second user on the messaging platform;
   filtering the messages based on the topic from the user request by predicting, via a topic classification model, whether the messages are related to the topic and excluding a subset of messages that are predicted to be unrelated to the topic;
   generating, by a text encoder of a multi-modal summarization model, a text representation from an input sequence corresponding to textual content from the filtered messages;
   generating, by an image encoder of the multi-modal summarization model, an image representation of visual features in a multimedia attachment file from the filtered messages;
   generating, via a decoder of the multi-modal summarization model, a text summary summarizing both the filtered messages and the multimedia attachment file based on a combination of the text representation generated by the text encoder and the image representation generated by the image encoder,
   wherein the text summary comprises a text that references a time and/or a sender of the multimedia attachment file generated from metadata of the multimedia attachment file; and
   transmitting, via the user interface, the generated text summary relating to the topic in response to the user request.

2. The method of claim 1, wherein the user request takes a form of a natural language question, and wherein the method further comprises:
   identifying, by parsing the natural language question, the first user, the second user and the topic.

3. The method of claim 1, wherein the user request further comprises one or more parameters entered via the user interface, and wherein the one or more parameters indicate any of:
   a time range;
   one or more conversation channels on the messaging platform; and
   a file format.

4. The method of claim 1, wherein the topic classification model is trained on a dataset of messages annotated with respective topic labels.

5. The method of claim 1, wherein the multimedia attachment file includes any of a spreadsheet file, a presentation slide file, an audio file, a video file and an image file.

6. The method of claim 5, further comprising:
   converting the audio file into a text document; or
   extracting one or more video frames from the video file.

7. The method of claim 1, further comprising:
   receiving, from the user interface, user feedback relating to the text summary;
   generating an updated text summary according to the user feedback; and
   incorporating the updated text summary into a training dataset for training the multi-modal summarization model.

8. The method of claim 1, wherein the predicting, via the topic classification model, whether the messages are related to the topic comprises:
   extracting one or more entities from the user request; and
   predicting, one or more keywords related to the extracted one or more entities.

9. A system of multi-modal summarization of communication on a messaging platform, the system comprising:
   a user interface that receives a user request for summarizing communication messages relating to a topic between a first user and a second user on a messaging platform;
   a memory storing a plurality of processor-executable instructions; and
   one or more processors executing the plurality of processor-executable instructions to perform operations comprising:
      searching, via a search engine, for messages between the first user and the second user on the messaging platform;
      filtering the messages based on the topic from the user request by predicting, via a topic classification model, whether the messages are related to the topic and excluding a subset of messages that are predicted to be unrelated to the topic;

generating, by a text encoder of a multi-modal summarization model, a text representation from an input sequence corresponding to textual content from the filtered messages;

generating, by an image encoder of the multi-modal summarization model, an image representation of visual features in a multimedia attachment file from the filtered messages; and generating, via a decoder of the multi-modal summarization model, a text summary summarizing both the filtered messages and the multimedia attachment file based on a combination of the text representation generated by the text encoder and the image representation generated by the image encoder, wherein the text summary comprises a text that references a time and/or a sender of the multimedia attachment file generated from metadata of the multimedia attachment file;

wherein the user interface transmits the generated text summary relating to the topic in response to the user request.

10. The system of claim 9, wherein the user request takes a form of a natural language question, and wherein the operations further comprise:

identifying, by parsing the natural language question, the first user, the second user and the topic.

11. The system of claim 9, wherein the user request further comprises one or more parameters entered via the user interface, and wherein the one or more parameters indicate any of:

a time range;

one or more conversation channels on the messaging platform; and a file format.

12. The system of claim 9, wherein the topic classification model is trained on a dataset of messages annotated with respective topic labels.

13. The system of claim 9, wherein the multimedia attachment file includes any of a spreadsheet file, a presentation slide file, an audio file, a video file and an image file.

14. The system of claim 13, wherein the operations further comprise:

converting the audio file into a text document; or extracting one or more video frames from the video file.

15. A non-transitory processor-readable storage medium storing a plurality of processor-executed instructions for multi-modal summarization of communication on a messaging platform, the instructions being executed by one or more processors to perform operations comprising:

receiving, via a user interface, a user request for summarizing communication messages relating to a topic between a first user and a second user on a messaging platform;

searching, via a search engine, for messages between the first user and the second user on the messaging platform;

filtering the messages based on the topic from the user request by predicting, via a topic classification model, whether the messages are related to the topic and excluding a subset of messages that are predicted to be unrelated to the topic;

generating, by a text encoder of a multi-modal summarization model, a text representation from an input sequence corresponding to textual content from the filtered messages;

generating, by an image encoder of the multi-modal summarization model, an image representation of visual features in a multimedia attachment file from the filtered messages;

generating, via a decoder of the multi-modal summarization model, a text summary summarizing both the filtered messages and the multimedia attachment file based on a combination of the text representation generated by the text encoder and the image representation generated by the image encoder, wherein the text summary comprises a text that references a time and/or a sender of the multimedia attachment file generated from metadata of the multimedia attachment file; and transmitting, via the user interface, the generated text summary relating to the topic in response to the user request.

* * * * *